United States Patent Office 3,189,387
Patented June 15, 1965

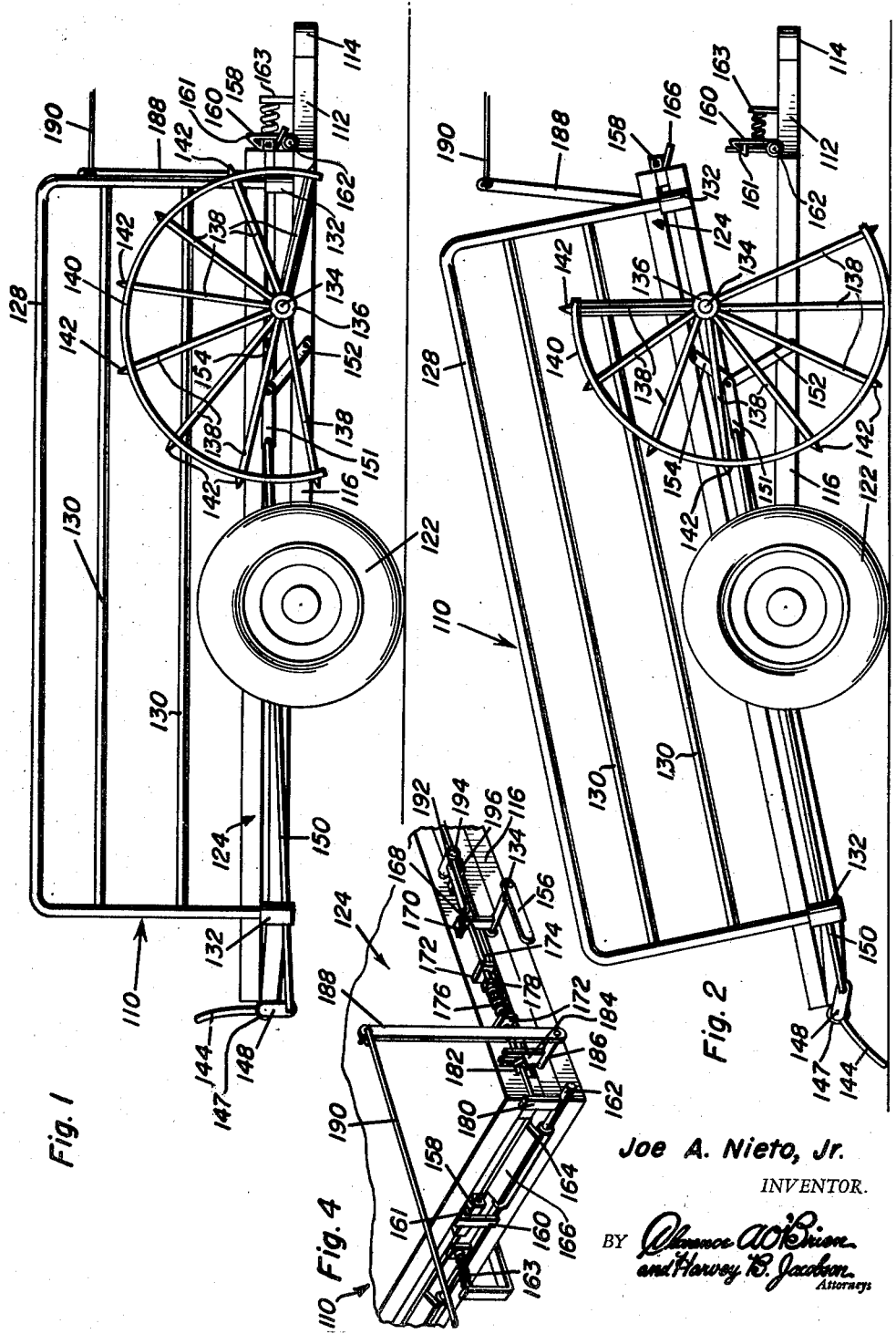

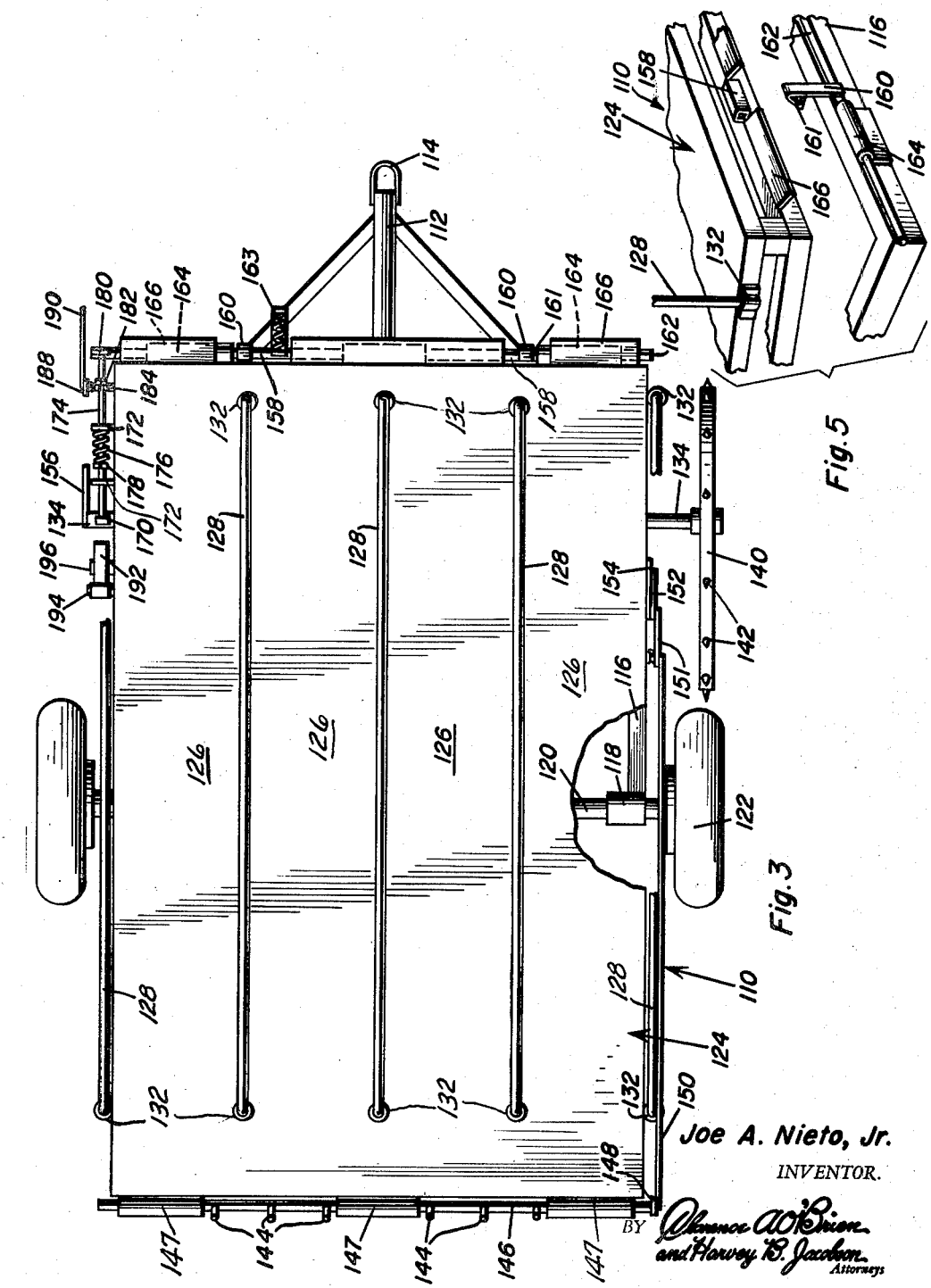

3,189,387
VEHICLE MOTION ACTUATING TILTING TRAILER BED
Joe A. Nieto, Jr., Rte. 2, Box 49, Roswell, N. Mex.
Original application Oct. 19, 1959, Ser. No. 847,187, now Patent No. 3,052,342, dated Sept. 4, 1962. Divided and this application June 14, 1962, Ser. No. 205,820
4 Claims. (Cl. 298—5)

This application is a division of application Serial No. 847,187, filed October 19, 1959, which has matured into Patent No. 3,052,342, issued September 4, 1962.

The present invention generally relates to a hay bale handling device and more particularly to a trailer for attachment to a hay baler having a vertically adjustable discharge chute and a laterally adjustable drawbar, which trailer is adapted to be filled with a predetermined number of bales of hay and then automatically dumped whereby the bales of hay will be dumped on the field in groups rather than being deposited one at a time onto the ground from the hay baler.

In present day practice, it is usual for a pickup baler to pick up the cured hay directly from a windrow and compress the hay into bales and discharge the bales back onto the ground surface at spaced intervals. This requires a second picking up operation which is either done by hand or by various machines for picking up bales of hay and depositing them on vehicles such as trucks, wagons or the like. In view of the scattered condition of the bales of hay when discharged from the baler, it is a time consuming job in loading the bales of hay onto a load carrying vehicle. Therefore it is the primary object of the present invention to provide a trailer for hay balers which will gather a plurality of hay bales and subsequently dump the bales in a group onto the field thereby facilitating subsequent loading and transportation of the bales of hay.

Another object of the present invention involves the provision of a trailer including a mechanism for either retaining the bales of hay or discharging the bales at the option of the operator of the device.

An additional object of the present invention involves the provision of a trailer provided with a plurality of longitudinally extending compartments for the most efficient utilization of the space thereon.

Yet another object of the present invention is to provide an attachment for hay balers which is simple in construction, easy to operate, easy to attach, efficient in handling baled hay and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the trailer illustrating its normal transport position;

FIGURE 2 is a side elevational view similar to FIGURE 1 but showing the dump trailer in dumped position;

FIGURE 3 is a plan view of the trailer with portions broken;

FIGURE 4 is a detailed view illustrating the latch structure for the forward end of the trailer; and FIGURE 5 is a partial perspective view of the forward corner of the trailer.

Referring now more specifically to the drawings, reference numeral 110 generally designates the dumping trailer which includes a forwardly extending tongue 112 having a generally U-shaped fitting 114 on the forward end thereof for detachable connection to the rear end of a laterally adjustable hay baler drawbar. The tongue 112 extends rearwardly in the form of a horizontal U-shaped frame 116 terminating in transverse sleeves 118 encircling a transverse rigid axle 120 carrying ground engaging wheels 122 on the outer ends thereof which may be of the type having pneumatically inflatable tires thereon. Carried by the axle 120 is a load supporting platform 124 having the surface thereof divided into a plurality of longitudinal areas 126 by upstanding U-shaped tubular rods or pipes 128 forming partitions and having the vertical legs thereof interconnected by a plurality of longitudinal members 130. The lower ends of the inverted U-shaped rods 128 are detachably received in vertically disposed sockets 132 for permitting removal of the tubular partition members which divide the load carrying platform 124 into the plurality of areas 126. Thus, a hay baler discharge chute may discharge the bales of hay into the different areas 126 by virtue of the use of a laterally shiftable drawbar for aligning the different areas 126 with the discharge chute. Further, the partitions 128 enable the stacking of bales of hay in a manner so as to enable the rearward pushing of an entire stack until the complete area 126 is filled after which another area 126 is filled and after all of the areas are filled, a dumping mechanism is operated for dumping the bales from the trailer onto the ground.

The dumping mechanism includes a shaft 134 rotatably mounted adjacent the forward end of the platform 124. The shaft 134 is provided with a hub 136 at one end and a plurality of spokes 138 extend outwardly from hub 136. The spokes 138 are secured to an eccentric rim member 140 and the rim 140 is provided with radial projections 142 for traction. The rim 140 is eccentric about the shaft 134 and will elevate the forward end of the platform 124 about axle 120 when the entire eccentric wheel assembly is rotated about the axis of the shaft 134 to initially bring the lowest point of the eccentric rim into engagement with the ground surface whereby subsequent forward movement of the trailer will cause the forward end of the platform to be elevated as the highest point of the rim engages the ground surface. Elevation of the forward end of the platform 124 will cause the rearward pivotal movement of a rear tailgate assembly in the form of upstanding rods 144, the rods 144 being carried by a transverse shaft 146 journaled in sleeves 147 attached to the rear edge of the platform 124. One end of shaft 146 has laterally extending operating arm 148 attached thereto and the arm 148 is connected to an elongated rod 150 which extends forwardly alongside platform 124. The forward end of the rod 150 is connected by a rigid link 151 to the juncture point of a pair of links 152 and 154 which are pivotally connected to the frame 116 and the platform 124 respectively. Thus, upward movement of the forward end of the platform 124 will cause the pivotal connection between the links 152 and 154 to move forwardly as the links 152 and 154 straighten out into alignment with each other. This moves rod 150 forwardly and swings rods 144 rearwardly thus allowing the hay bales to slide off the rear of the platform 124.

The other end of the shaft 134 is provided with an elongated handle 156 which is in the form of a weight which overbalances the wheel assembly for normally urging the low point of the eccentric rim 140 downwardly towards the ground surface from the condition illustrated in FIGURE 1. Also, the forward edge of the platform 124 is provided with forwardly projecting hollow rectangular members 158 for engagement by hook-type latches 160 mounted on a transverse shaft 162, each latch having an inclined cam surface 161 for forcing the latch 160 outwardly when the member 158 passes downwardly. The shaft 162 is carried by bearing brackets 164 on the frame 116 and the platform is provided with downwardly inclined members 166 overlying and engaging the bearing members 164 when the latches 160 are engaged with the rectangular members 158. The shaft 162 is biased in a direction towards the frame 116 by a coil spring 163 engaged with a suitable lug on shaft 162. The spring may be either a compression or tension spring and is associated with the shaft 162 to urge latches 160 towards the members 158 for latching engagement therewith.

FIGURE 4 illustrates the details of the latch mechanism in which the transverse shaft 134 which supports the eccentric wheel assembly on one end thereof and has the eccentric weight 156 on the other end thereof is provided with an upstanding lug 168 having a forwardly extending upper end 170. Mounted on the side edge of the platform 124 is a pair of guide lugs 172 which slidably support a longitudinal rod 174 having the rear end thereof normally abuttingly engaging the front surface of the lug 168 below the forwardly extending top edge 170. A compression coil spring 176 is engaged between the forwardmost lug 172 and a stop nut 178 on the rod 174 thus spring biasing the rod rearwardly into engagement with the lug 168. The forward end of the rod 174 is disposed immediately adjacent the inner surface of an upstanding lug 180 rigid with the transverse shaft 162 carrying the latches 160 thereon. Thus, when the rod 174 is moved longitudinally forwardly, the forward end thereof will engage the lug 180 and cause the shaft 162 to pivot, swinging the latches 160 forwardly thereby disengaging the latches from the rectangular members 158 which will permit the platform 124 to swing upwardly about the axle 120 upon engagement of the eccentric rim 140 with the ground. Also, the forward movement of the rod 174 will withdraw the rear end thereof away from the lug 168 which will permit the lug 168 and the shaft 134 to rotate in a counter-clockwise direction as seen in FIGURE 4 whereby the overbalance weight 156 will cause the shaft 134 and the eccentric wheel assembly to rotate for bringing the low point of the eccentric rim 140 into engagement with the ground surface for effecting the upward swinging of the platform as the vehicle moves forwardly. This is permitted by virtue of the rod 174 being moved out of the path of movement of the lug 168 as it moves in a circular path.

The mechanism for moving the rod 174 longitudinally includes an abutment or stop member 182 on the rod member which has abutting contact with a slotted lug 184 carried by a shaft 186 supported on the platform 124. The shaft 186 is rotatable and provided with an elongated upstanding arm or lever 188 to which is attached a flexible line 190 at the upper end thereof which extends forwardly to an operator's position whereby an operator may pull the line 190 and rotate the shaft 186 which will swing the slotted lug 184 in an arcuate path thus pulling the rod 174 forwardly and releasing the latches 160 and releasing the shaft 134 for revolution in a counter-clockwise manner.

Disposed rearwardly of the lug 168 is a pivotal dog or pawl 192 carried by a pin 194 and resting normally in a horizontal position against a lug 196 with the forward end thereof disposed adjacent the rear surface of the lug 168 to prevent reverse rotation thereof thus providing a one revolution clutch arrangement with the overbalance of the eccentric wheel and weight 156 causing the wheel assembly to rotate back to the position of FIGURE 1 and to be locked in this position until the flexible line 190 is pulled. This overbalance is achieved by positioning the weight 156 on the shaft so as to be forward of the vertical as the following or enlarged rear end of the segmental wheel leaves the ground.

The hay bales are loaded onto the trailer by causing the trailer to be laterally moved for alignment of the different areas with the discharge chute of a pickup baler or stationary baler which are conveyed onto the trailer by the conveying chain and other associated equipment.

When the trailer has been filled with the bales of hay, the trip rope 190 is actuated for elevating the front end of the platform and at the same time lowering the rear retainer rods 144 so that the hay bales can slide off of the trailer. As the eccentric wheel completes its revolution it will be disposed in the condition illustrated in FIGURE 1 and the front end of the trailer will drop whereby the lower outer corners of the projections 158 will engage the cam surface 161 of the latches 160 in an obvious manner for again locking the trailer in position for receiving additional bales of hay.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A trailer comprising a mobile wheeled frame, a platform, means connecting the platform to the frame for swinging movement about a horizontal axis disposed adjacent the rear of the frame, and means mounted on the forward portion of the platform for elevating the forward end of the platform in response to forward movement of the frame, said last-mentioned means including an elongated shaft rotatably mounted on the forward portion of the platform and extending transversely thereacross, a segmental eccentric wheel fixed to one end of said shaft along one side of the platform for rotation therewith and selective engagement with the ground, said eccentric wheel having a progressively greater radial dimension from a shorter forward end to a larger rear end, a counterweight fixed to the shaft, said counterweight being orientated so as to bias the shaft and wheel toward the forward end of the frame for initial engagement of the shorter end of the wheel with the ground, releasable latch means for preventing rotation of said shaft and maintaining the wheel out of engagement with the ground, and means for limiting rotation of said shaft, upon a release of the latch means, to one complete revolution.

2. The device of claim 1 wherein said latch means includes a projecting lug on said shaft, an elongated rod engaged with the forward face of said lug so as to prevent a forward rotational movement of both the lug and the shaft, and means for withdrawing said rod from engagement with the lug so as to allow a free rotation of both the lug and shaft under the influence of the counterweight.

3. The device of claim 2 including second releasable latch means interconnecting the forward ends of the platform and frame, said elongated rod being engaged with said second latch means in a manner so as to cause a release thereof upon a withdrawal of the rod from engagement with the lug of the first-mentioned latch means.

4. The device of claim 2 wherein the counterweight and latch means are engaged with the second end of the shaft along the second side of the platform.

References Cited by the Examiner

UNITED STATES PATENTS

| 908,633 | 1/09 | White | 298—5 |
| 1,246,239 | 11/17 | Cox | 298—23 X |
| 1,373,000 | 3/21 | Gilbert et al. | 298—1 |
| 1,416,975 | 5/22 | Pullar | 298—23 |
| 1,599,465 | 9/26 | Gilmore | 298—23 |
| 2,617,683 | 11/52 | Strom | 298—20 |

FOREIGN PATENTS

| 2,939 | 1914 | Great Britain. |
| 12,198 | 1908 | Great Britain. |
| 460,995 | 2/37 | Great Britain. |
| 875,765 | 5/53 | Germany. |

MILTON BUCHLER, *Primary Examiner.*

LEO QUACKENBUSH, EUGENE G. BITZ,
*Examiners.*